United States Patent [19]

Ruiz de Palacios

[11] 4,350,708
[45] Sep. 21, 1982

[54] NATURAL OAK AROMA FOR ACCELERATING AGING OF ALCOHOLIC BEVERAGES

[75] Inventor: Jose I. Ruiz de Palacios, Logrono, Spain

[73] Assignee: Sistemas Naturales Internacionales, S.A., Sinatin, S.A., Madrid, Spain

[21] Appl. No.: 147,360

[22] Filed: May 7, 1980

[30] Foreign Application Priority Data

May 18, 1979 [ES] Spain ................................. 480691

[51] Int. Cl.³ ......................... C12G 1/00; C12G 3/00
[52] U.S. Cl. ....................................... 426/11; 426/15; 426/592; 426/386; 426/429; 426/431
[58] Field of Search ................ 426/15, 592, 386, 429, 426/431, 494, 422, 11

[56] References Cited

U.S. PATENT DOCUMENTS 2,807,547  9/1957  Nickol .............................. 426/592 X
2,859,117  11/1958  Braus et al. ...................... 426/429 X
3,386,832  6/1968  McCabe ............................. 426/422
3,935,317  1/1976  Bianchi ........................... 426/431 X
4,173,656  11/1979  Duggins ............................ 426/422

Primary Examiner—David M. Naff
Attorney, Agent, or Firm—Eyre, Mann, Lucas & Just

[57] ABSTRACT

A natural oak aroma for accelerating the aging of wine, spirits, and liqueurs is prepared by extracting oak wood shavings with a solution of ethanol in water to produce a first extract, extracting oak wood shavings with demineralized water to produce a second extract and combining the first and second extracts.

9 Claims, 1 Drawing Figure

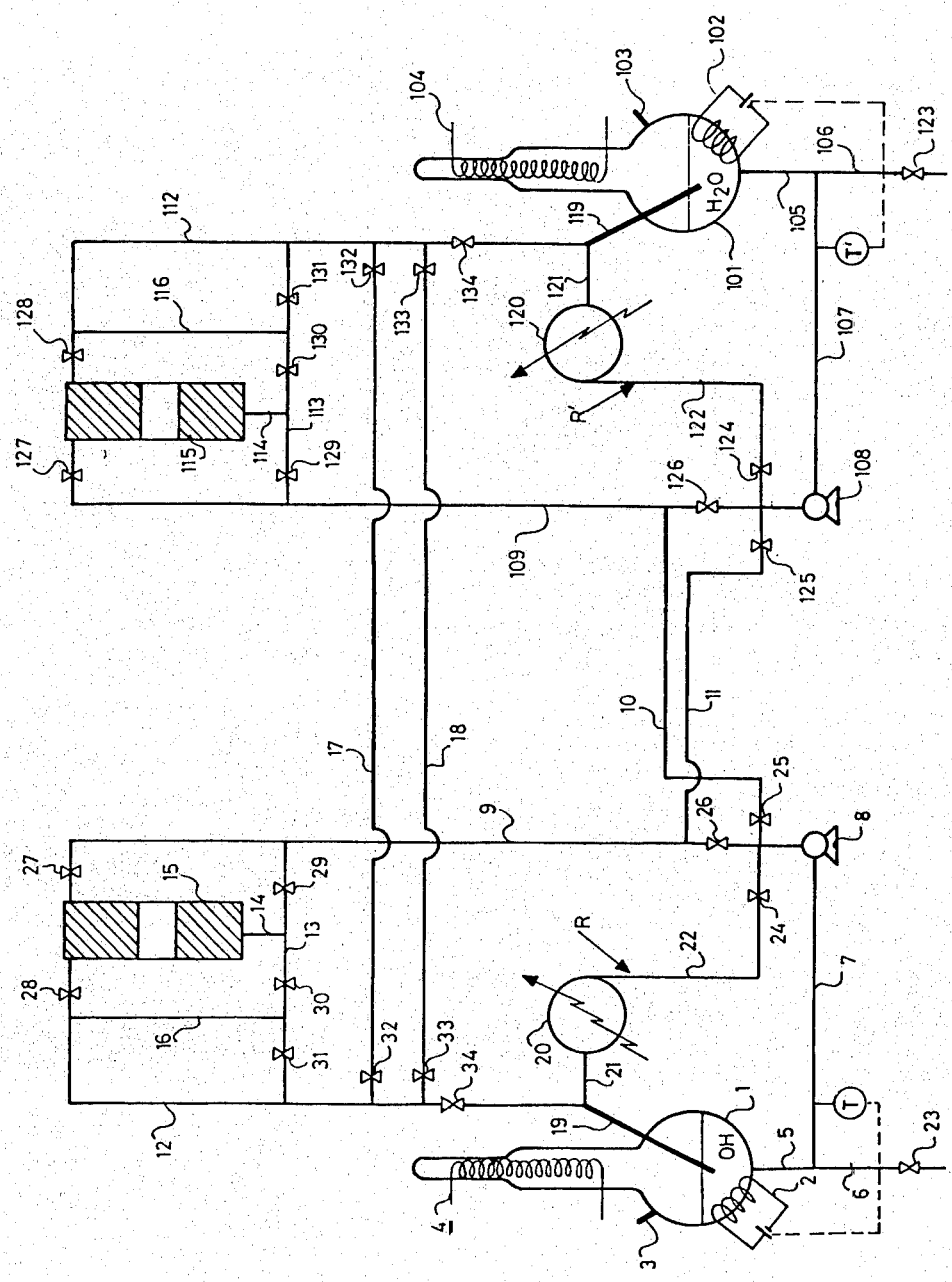

NATURAL OAK AROMA FOR ACCELERATING AGING OF ALCOHOLIC BEVERAGES

The present invention relates to a new natural oak aroma, to a process for the obtention of the same, as well as to the applications of the said aroma to the treatment of wine and spirits or liqueurs, in order to accelerate and make their aging easier.

As far as wine is concerned, it is well-known that the natural aging process is a critical operation, which involves many drawbacks, practically speaking. In fact, the aging of wine in oak barrels results from a very complicated physical and chemical process. In general terms, the acidity of the wine decreases, the alcohol, the acids and other components are transformed and gathered in several complex combinations to create new chemical compounds, such as aldehydes and acetales with, sometimes, a salt precipitate. In fact, the process results from a complex physical and chemical interaction between the wine components and those of the wood of the barrels that receive wine. The classical aging process implies, of course, a great deal of time; according to the regions and the nature of the wine, the aging time varies between two and twenty years, which, in the case of a large cellar, requires a high investment in barrels as well as an important quantity of wine in stock.

Moreover, because of the continous evaporation, there is a loss in raw material which, as it must be compensated, also implies labor expenses to carry out this operation. A 225 liter barrel of red wine, for exemple, loses at least one liter a month; consequently, one must make sure that the barrels are always full, by completing the wine level about once a week in winter and twice a week in summer. In addition, oak barrels are expensive on purchase and maintenance and take up a great deal of room.

To overcome this drawback, the attempt has already been made to solve these problems through two different ways, either by the preparation of an oak aroma concentrate to be added to the wine, or through physical ways such as the treatment of wine by electromagnetic radiations from various parts of the spectrum or by ultra-sounds.

Among the attempts of the first way, the maceration of oak shavings in a hydroalcoholic solution must be pointed out, as well as the distillation under reduced pressure of a hydro-alcoholic solution, in which the pieces and oak shavings are immerged. In the maceration process, oak wood is placed in a hydro-alcoholic solution during a certain space of time, after which the solution extracts the coloring agents, but which, like in the case of distillation under reduced pressure, gives a syrup, rich in "nose" components and poor in "mouth" components. Therefore, besides the concentrated syrup, other natural or synthetic products that soon disappear, must be added to the wine. The failure of these processes seems to stem from the fact that they do not extract from the oak the fixing products constituted by the gum-resins which are supposed to be important for the "mouth" qualities.

Regarding the attempts of the second way, the treatment by electromagnetic radiations, infrared radiations or ultraviolet radiations or by ultrasounds constitute sophisticated and expensive processes which are not successful with wine. With liqueurs, on the contrary, a certain result has been obtained although not at an industrial level.

For spirits and liqueurs, problems are similar but the loss by evaporation takes a greater importance.

It is thus understood that it is most interesting to perfect a new system which does not present the drawbacks of the above-mentioned processes or those of the conventional process, that is to say: time, need for important stocking, high investment in materials, frequent interventions, factors that significantly affect the process profitability.

This could be obtained according to the present invention, thanks to a new process leading to the obtention of a natural oak aroma which, when added in a very small quantity—0.90 to 1.50% in volume—confers to new wines, the fermentation of which is already over, to spirits and liqueurs, within a short time, all the qualities of similar products, nautrally aged.

According to one essential characteristic of the invention, this natural oak aroma, intended to accelerate the aging of wines, spirits and liqueurs, is obtained through the solid-liquid extraction on shavings and pieces of oak, under an over-pressure of 0.0 to 0.5 bar, by a first extraction at a temperature between 25° and 40° C. with a hydroalcoholic solution (a solution of ethanol in water) titrating between 45° and 70°, the degree titrate being the concentration of ethanol in the solution as determined by an alcoholometer the extract being cooled to 20° C., before being gathered, it is followed by a second extraction, at a temperature between 30° and 95° C. but always higher than that of the first extraction, with demineralized water running in the opposite direction of that of the solution in the first extraction, the extract being cooled to 20° C. before being gathered. The two extracts, thus prepared, are then gathered in such proportions that the final mixture titrates between 30° and 50° C.

According to an important characteristic of the invention, the relative proportions of oak shavings and hydroalcoholic solution are comprised between 0.3 and 0.5 kg of oak shavings per liter of solution.

According to another important characteristic of the invention, the total extraction time is comprised between 2 and 5 hours, the extraction period of the first phase—1 to 3 hours—being always longer than that of the second phase—30 minutes to one hour and 30 minutes.

According to another important characteristic of the invention, the pressure used for the first extraction is always higher than that used for the second extraction.

The above-defined method of obtention gives a first alcoholic extract which titrates from 5° to 12° less than the initial hydro-alcoholic solution and a second aqueous extract titrating 5° to 15° in alcohol (dragging along of the hydro-alcoholic solution which impregnated the shavings after the first extraction).

The chromatographic analysis of the first extract shows the presence of volatile components with a low boiling temperature, such as acids, aldehydes, superior alcohols, esters and furfurals, as well as some parts of coloring agents and tannates. In the second extract, there are coloring agents, tannates, sugars, metalic ions, gum-resins and some superior alcohols or fusel oils which are part of what is called "cola".

Shortly after the treatment with the natural oak aroma according to the present invention, wines, liqueurs and spirits acquire a more stable taste bringing out the qualities corresponding to those of the naturally aged products. Very rapidly and whatever container may be used (oak barrels, tanks with chemically inert walls or bottles), these qualities are obvious and confer to the treated products the same characteristics as those aged in oak barrels.

Laboratory studies enabled to verify that more than 50% of the qualities of the aged wines, liqueurs and spirits, especially "nose" and "mouth", come from the products extracted, by the spirits, from the oak walls of the barrels containing them during the aging.

According to the process of the invention, a natural concentrated oak aroma, containing all the elements required for aging, could be successfully extracted. This aroma, that appears in liquid form, is easy to use, instantaneously soluble and enables to obtain, within a few weeks, the result, which until today, took years to be reached.

It can be asserted that the use of the product obtained by the process of the present invention accelerates the aging process, as proved by the chromatographic analysis of the wines and liqueurs, aged according to the conventional process in oak barrels, and of the wines and liqueurs of the same kind, containing the natural oak aroma, obtained according to the process which is the subject of the present invention. In both cases, the said chromatographic analyses gave substantially identical analyses. Moreover, tests performed by expert wine tasters gave positive results for they could not make the difference between a determined kind of wine, aged according to the conventional process and the same wine, aged with an addition of oak aroma, obtained by the process according to the invention.

According to a variant, especially for spirits, of the process of the present invention, the extraction and addition of an oak aroma could be performed in a single operation: it is just required to start the first extraction of the process, using as a hydro-alcoholic solution of extraction, directly the spirit to be treated. The result is not significantly different from what is obtained when adding to the spirit a complete extract as obtained here-above, since anyway, the extracts with the highest degrees of alcohol are added to the spirits.

The invention will be better understood with the following description, given as a non-limiting example, according to the enclosed drawing.

On this drawing, the single sketch represents a double installation of extraction, the right and left portions of which are symetrical; for a better understanding of the detailed description, the elements of the right portions bear the same references, increased with 100, as their homologues on the left portions; the intercommunication elements 10, 11, 17 and 18, which are themselves their own homologues, have, of course, only one designation.

DESCRIPTION OF THE INSTALLATION

Each element of this double installation comprises a heating unit with a vessel 1(101) fitted with a heating system 2(102), a feeding system 3(103) and a condensation system 4(104). A pipe 5(105), divided into two sections 6(106) and 7(107), starts from the lower part of each vessel 1(101). With the section 6(106), the extracted liquid solution can be removed from the extraction circuit at the end of the operation. The section 7(107) is connected with the aspiration side of the pump 8(108). The delivery side of this pump is connected to the pipe 9(109) which, in its turn, can be linked up with the pipes 10 and 11 and enables solutions to be transfered between both installations. The pipe 9(109), during the extraction phases, normally leads to either the upper part or the lower part—by-pass 13(113) and 14(114)—of an extraction column containing a basket 15(115) for receiving the oak shavings.

Other pipes, bearing the references 12(112), 19(119), 21(121), 16(116), 17 and 18 ensure either the recycling in the installation or the transfering to the sister installation. Regarding the recycling connections, the pipe 12(112) sends back the extraction solution, either towards the heating unit through 19(119), or towards a cooling circuit R(R'), composed of a heat exchange unit 20(120) via the pipe 21(121); the cooled solutions run out of the unit through the pipe 22(122).

Regarding the transfer connections, they are made through the pipes 17 and 18, as well as through the pipes 10 and 11, as indicated here-above.

The basket 15(115) standing in the extraction column is made of stainless steel (hatched area on the drawing) as far as its upper and lower parts are concerned but the central ring-shaped part is made of boronsilcate glass, through which it can be verified that the extraction solution flows properly through the column.

Besides, in order to control the temperature of the extraction solution, appropriate means of regulation, driven by the indications of a thermosound T(T') have been provided.

Moreover, many valves 23(123), 24(124), 25(125), 26(126), 27(127), 28(128), 29(129), 30(130), 31(131), 32(132), 33(133) and 34(134) were inserted in several places to modify the circulation of the solution according to the operational phases.

As the installation used in the case of the present invention requires only known materials, a schematic drawing is sufficient. Accordingly, regulation instruments (manometer, ammeter etc.) and safety devices (valves, circuit-breaker, etc.) as well as electric lines were not represented.

WORKING

Both hydro-alcoholic and aqueous extracts are obtained in the installation in the following way: the whole amount of oak shavings to be extracted is divided into two equal parts and fibre-glass bags are filled with them and put into the baskets 15 and 115. After closing the valves 23 and 123, the hydro-alcoholic solution (symbol OH on the drawing) is then poured into the vessel 1 and water (symbol $H_2O$) into the vessel 101.

After adjusting the heating regulation device at the required temperature $T_1$, it is started. The valves 24, 25, 27, 30, 31, 32 and 33 are closed, the valves 26, 28, 29, 34 remain open and the pump 8 is started when the temperature $T_1$ is reached. The solution OH flows from the heating vessel 1 to the basket 15 through which it runs upwards before going back to the vessel 1. If the total extraction time chosen by the hydro-alcoholic phase is $t_1$, this operation will last $t_1/2$. At the end of this operation, the hydro-alcoholic solution will be sent into the extraction column of the sister installation so that the shavings that it contains may be extracted.

By the closing of the valves 26, 28, 126, 127, 130, 133 and 134 and the opening of the valves 25, 32, 128, 129 and 132, the recirculation of this solution is effected between the vessel 1 and the basket 115, crossed upwards, while maintaining the temperature $T_1$ during the same time $t_1/2$, at the end of which the heating 2 is stopped; the solution OH then flows in the cooling circuit (closing of the valves 25 and 34, opening of the valve 24) till it reaches room temperature. Afterwards, the hydro-alcoholic extract is drawn off by the pipe 6 (opening of the valve 23) and put aside in a closed vessel.

While the solution OH runs between the vessel 1 and the cooling device, the aqueous solution flows between the vessel 101 and the basket 15, crossed downwards, during $t_2/2$ at a temperature $T_2$, the parameters $t_2$ and $T_2$ being respectively the extraction time and temperature retained for the aqueous solution. When the time $t_2/2$ is over, a circuit is set up between the vessel 101 and the basket 115, crossed downwards, following symetrically what has been described here-above. At the end of this second cycle of aqueous extraction, lasting $t_2/2$ and also performed at the temperature $T_2$, the aqueous solution runs between the vessel 101 and the cooling device R' of the right installation. Of course, the heating 102 was previously cut off. As soon as the aqueous extract has reached the room temperature, it is drawn off by the pipe 106, by opening of the valve 123 and it is put aside in closed vessels.

The hydro-alcoholic and and aqueous extracts, thus obtained, are then mixed in appropriate proportions that vary according to the wine, the liqueur or the spirit to be treated to obtain the natural oak aroma, which is the subject of the invention. The addition of the aroma to wines, liqueurs or spirits give them an aging, which had never been reached till then by none of the methods tested before, in order to obtain a more rapid aging than by the conventional way.

The following example will illustrate with more details the way of obtention of the natural oak aroma, according to the invention.

EXAMPLE

According to the above-described method, a hydro-alcoholic extract and an aqueous extract are prepared, using the following parameters:

| Installation | |
|---|---|
| Content of the heating vessels 1 and 101 | 250 liters |
| Content of the baskets 15 and 115 | 200 liters |
| Working | |
| Amount of oak shavings in each basket | 38 kgs |
| (a) hydro-alcoholic extraction (OH) | |
| Quantity of solution (OH) | 152 l |
| Titer of the solution (OH) before extraction | 55° |
| Extraction temperature with the solution OH ($T_1$) | 36° C. |
| Total extraction time with the solution OH | |
| $t_1 = t_1/2$ (basket 15) + $t_1/2$ (basket 115) | 4h30 mn |
| Pressure in the circuit during the extraction with the solution OH | 0.45 bar |
| Titer of the hydro-alcholic extract thus obtained | 49° |
| (b) aqueous extraction (H$_2$O) | |
| Quantity of demineralized solution H$_2$O | 197 l |
| Extraction temperature with the solution H$_2$O ($T_2$) | 77° C. |
| Total extraction time with the solution H$_2$O | |
| $t_2 = t_2/2$ (basket 15) + $t_2/2$ (basket 115) | 50 mn |
| Pressure in the circuit during the extraction with the solution H$_2$O | 0.35 bar |
| Titer of the aqueous extract thus obtained | 8° |

With mixtures in appropriate proportions, there is obtained, for instance, a natural oak aroma titrating 36° in alcohol.

The advantage and the efficiency of the aroma according to the invention, will appear more clearly with the following test:

Ten expert wine tasters were given two samples of red wine (A and B), stemming from the same vineyard in the Rioja area. Wine A, vintage 1972, had been aged in oak barrels, for three years, according to the normal process. But Wine B, vintage 1976, had been treated with 1% in volume of natural oak aroma, obtained according to the process described in the above-mentioned example.

Among the ten tasters, four declared that the wines were of different vintages but could not say which was the older; three of them could not find any significant difference between both wines as to the vintage, the taste and the bouquet, but suggested that these wines might come from different cellars; the last three had much trouble in differentiating them.

The example, as described, leads to an aroma to be added to wines, liqueurs or spirits. However, in the special case of spirits, a similar result can be obtained, when performing only the single hydro-alcoholic extraction, the extraction solution being constituted by the spirit itself.

I claim:

1. A process for the obtention of a natural oak aroma for accelerating the aging process of wines, spirits and liqueurs through solid-liquid extraction which comprises:
   A. preparing a first extract by:
      a. preparing a hydro-alcoholic solution of ethanol in water which titrates in an alcoholometer between about 45° and about 70°;
      b. heating said hydro-alcoholic solution of ethanol in water to a temperature between about 25° C. and about 40° C.;
      c. contacting successively first and second batches of oak wood shavings with said heated hydro-alcoholic solution of ethanol in water while maintaining about 0.0 to about 0.5 bar overpressure, thereby producing a first extract from the contact of said hydro-alcoholic solution of ethanol in water with said oak wood shavings;
      d. cooling said first extract to about 20° C.;
      e. gathering the first extract;
   B. preparing a second extract by;
      a. heating demineralized water to about 30° C. to about 95° C.;
      b. contacting successively said second and first batches of oak wood shavings with said heated demineralized water thereby producing a second extract from the contact of said demineralized water with said oak wood shavings;
      c. cooling said second extract to about 20° C.;
      d. gathering the second extract;
   C. wherein the hydro-alcoholic solution of ethanol in water flows through the oak wood shavings in a first direction and the demineralized water flows through the oak wood shavings in a second direction, said second direction being opposite to said first direction and wherein the demineralized water is heated to a higher temperature than the temperature to which the hydro-alcoholic solution of ethanol in water is heated; and
   D. combining said first extract with said second extract in such proportions as to obtain an extract mixture which titrates in an alcoholometer between about 30° and about 50°.

2. The method of claim 1 wherein the oak shavings are present in the amount of 0.3–0.5 kg per liter of hydro-alcoholic solution of ethanol in water.

3. The method of claim 1 wherein the same wood shavings are used for the preparation of both the first extract and the second extract.

4. The method of claim 3 wherein the total extraction time is between 2 and 5 hours with the time of the first extraction being greater than that of the second extraction.

5. The method of claim 3 wherein pressure is used for each extraction and the pressure for the first extraction is higher than that for the second extraction.

6. The method of claim 1 wherein the first extract titrates in an alcoholometer at about 5° to about 12° less than the initial hydro-alcoholic solution of ethanol in water.

7. The method of claim 1 wherein the hydro-alcoholic solution of ethanol in water is spirits.

8. Natural oak aroma prepared according to any one of claims 1–5 or 6.

9. A process for aging an alcoholic beverage selected from the group consisting of wines, spirits and liqueurs comprising adding to said alcoholic beverage, after the completion of fermentation of said alcoholic beverage, from about 0.9% to about 1.5% by volume of an extract mixture from any one of claims 1–5 or 6.

* * * * *